US011138820B1

(12) United States Patent
Shen

(10) Patent No.: US 11,138,820 B1
(45) Date of Patent: Oct. 5, 2021

(54) UNLOCKING METHOD FOR AN ELECTRONIC LOCK

(71) Applicant: I-Ting Shen, Tainan (TW)

(72) Inventor: I-Ting Shen, Tainan (TW)

(*) Notice: Subject to any disclaimer, the term of this patent is extended or adjusted under 35 U.S.C. 154(b) by 0 days.

(21) Appl. No.: 15/931,718

(22) Filed: May 14, 2020

(30) Foreign Application Priority Data

Apr. 29, 2020 (TW) ................................. 109114336

(51) Int. Cl.
*G06K 9/62* (2006.01)
*G07C 9/00* (2020.01)
*G06K 9/00* (2006.01)

(52) U.S. Cl.
CPC ..... *G07C 9/00563* (2013.01); *G06K 9/00281* (2013.01); *G06K 9/00288* (2013.01); *G06K 9/00926* (2013.01)

(58) Field of Classification Search
CPC ................. G06K 9/00221–2009/00328; G06K 9/00899–9/00906; G07C 9/00563; G07C 9/26; G07C 9/37
See application file for complete search history.

(56) References Cited

U.S. PATENT DOCUMENTS

| | | | | |
|---|---|---|---|---|
| 10,740,637 B2* | 8/2020 | Garcia Rodriguez | . | G06Q 20/40 |
| 10,839,238 B2* | 11/2020 | Li | ...................... | G06K 9/00892 |
| 10,984,614 B2* | 4/2021 | Schmidt-Lackner | ...................... | G07C 9/00571 |
| 2015/0356802 A1* | 12/2015 | Cho | ..................... | G07C 9/00563 700/275 |
| 2016/0379042 A1* | 12/2016 | Bourlai | .............. | G06K 9/00228 382/118 |
| 2018/0330161 A1* | 11/2018 | Hanna | ................. | G06K 9/00906 |
| 2018/0357500 A1* | 12/2018 | Lin | .......................... | G06K 9/32 |

* cited by examiner

*Primary Examiner* — Brian Werner
(74) *Attorney, Agent, or Firm* — Karin L. Williams; Alan D. Kamrath; Mayer & Williams PC

(57) ABSTRACT

An unlocking method for an electronic lock includes capturing an environmental background outside of the electronic lock by a person. An environmental background feature is used to create an authenticated environmental background feature information and is saved in an authenticated environmental background feature database. At least one facial feature is set as an authenticated facial feature and is saved in an authenticated facial feature database. A real-time unlocking information is inputted by the person and analyzed to obtain the facial feature of the person and an environmental background feature. The authenticated electronic lock remains in a locking state when the environmental background feature cannot be not obtained. The electronic lock is unlocked only when the facial feature matches with the authenticated facial feature and the environmental background feature matches with the authenticated environmental background feature.

12 Claims, 9 Drawing Sheets

UNLOCKING METHOD FOR AN ELECTRONIC LOCK

BACKGROUND OF THE INVENTION

The present invention relates to an unlocking method for an electronic lock and, more particularly, to an unlocking method for an electronic lock whose position is fixed when in a locking position.

A type of electronic lock currently available on the market can be unlocked through facial identification by using a camera directly mounted on the electronic lock or a camera on a smart mobile device. When unlocking is required, the facial feature of a person is captured by the camera and is compared with authorized persons' facial features in a database. The electronic lock is unlocked when the facial feature matches with one of the authorized person's facial features. The electronic lock remains in the locked state when the captured facial feature do not match with any facial feature in the database.

The technique of comparison or identification of the facial feature provides convenience in the unlocking procedure of the electronic locks. Improvement is, however, still required. Specifically, this technique cannot identify whether the facial feature captured by the camera is on a picture or screen or is of a real person. In a case that a picture or screen with a facial feature of an authorized person is placed in front of the camera, there is a high possibility that the system can be fooled and unlocked. Namely, the picture or screen with facial feature may be inputted by an unauthorized person, and the facial feature of any person can be easily obtained from a social media through the network, leading to risks in the identification accuracy of the facial feature. Thus, a need exists for a reliable identification method for an electronic lock.

BRIEF SUMMARY OF THE INVENTION

In a first aspect, the present invention provides an unlocking method for an electronic lock, comprising:

creating an authenticated environmental background feature information including setting an environmental background feature as an authenticated environmental background feature and saving the authenticated environmental background feature in an authenticated environmental background feature database, wherein the environmental background feature is a feature of the environmental background where the electronic lock locates;

creating an authenticated facial feature database including setting at least one facial feature as an authenticated facial feature and saving the authenticated facial feature in the authenticated facial feature database;

inputting a real-time unlocking information including inputting the real-time unlocking information containing a facial feature of a person intending to unlock the electronic lock;

analyzing the real-time unlocking information to obtain the facial feature of the person and an environmental background feature, wherein the authenticated electronic lock remains in a locking state when the environmental background feature is not obtained; and comparing the facial feature obtained from analysis of the real-time unlocking information with the authenticated facial feature in the authenticated facial feature database and comparing the authenticated environmental background feature obtained from analysis of the real-time unlocking information with the authenticated environmental background feature in the authenticated environmental background feature database, wherein when the facial feature obtained from analysis of the real-time unlocking information does not match with the authenticated facial feature and/or the environmental background feature obtained from analysis of the real-time unlocking information does not match with the authenticated environmental background feature, the electronic lock remains in the locking state, wherein when the facial feature obtained from analysis of the real-time unlocking information matches with the authenticated facial feature and the environmental background feature obtained from analysis of the real-time unlocking information matches with the authenticated environmental background feature, the electronic lock is unlocked.

In the unlocking method according to the present invention, the unlocking procedure can be conducted only when both the facial feature and the environmental background feature are correct. Furthermore, since the authenticated environmental background feature is the environmental background where the electronic lock locates, the person intending to unlock the electronic lock must be near the electronic lock to capture the real-time unlocking information so as to capture the correct facial feature and the correct environmental background feature. It is very difficult to obtain the correct facial feature and the correct environmental background feature of an authorized person by any other person. This greatly reduces the possibility of unlocking of the electronic lock through cheating.

In a second aspect, the present invention provides an unlocking method for an electronic lock, comprising:

setting a suggested waiting area spaced from the electronic lock:

capturing an environmental background outside of the electronic lock by a person standing in the suggested waiting area, using an environmental background feature to create an authenticated environmental background feature information, and saving the authenticated environmental background feature information in an authenticated environmental background feature database, wherein the environmental background feature is a feature of the environmental background;

creating an authenticated facial feature database including setting at least one facial feature as an authenticated facial feature and saving the authenticated facial feature in the authenticated facial feature database;

inputting a real-time unlocking information including inputting the real-time unlocking information containing a facial feature of the person intending to unlock the electronic lock:

analyzing the real-time unlocking information to obtain the facial feature of the person and an environmental background feature, wherein the authenticated electronic lock remains in a locking state when the environmental background feature is not obtained; and comparing the facial feature obtained from analysis of the real-time unlocking information with the authenticated facial feature in the authenticated facial feature database and comparing the environmental background feature obtained from analysis of the real-time unlocking information with the authenticated environmental background feature in the authenticated environmental background feature database, wherein when the facial feature obtained from analysis of the real-time unlocking information does not match with the authenticated facial feature and/or the environmental background feature obtained from analysis of the real-time unlocking information does not match with the authenticated environmental background feature, the electronic lock remains in the locking state, wherein when the facial feature obtained from analysis of the real-time unlocking information matches with the authenticated facial feature and the environmental background feature obtained from analysis of the real-time unlocking information matches with the authenticated environmental background feature, the electronic lock is unlocked.

In an example of the first aspect, the electronic lock is mounted on a door on which a camera is disposed and electrically connected to the electronic lock. The camera includes a ToF lens module. The unlocking method further comprises steps prior to creating the authenticated environmental background feature information. The steps include:

closing the door on which the electronic lock is mounted, wherein the camera faces the environmental background outside of the electronic lock when the door is in a closed position; and capturing the environmental background outside of the electronic lock while the door is in the closed position, and using the environmental background feature to create the authenticated environmental background feature information.

When the camera is equipped with a ToF lens module, the distance between the face and the environmental background can be measured. This allows subsequent confirmation of whether the inputted real-time unlocking information is a photograph, a picture, or a screen basing on the fact that the distance of the facial feature in the photograph, picture, or screen is the same as the environmental background feature. This further reduces the possibility of unlocking of the electronic lock through cheating.

In an example of the first aspect, the unlocking method further comprises setting a suggested waiting area spaced from the electronic lock. The real-time unlocking information is inputted by the person when the person is in the suggested waiting area.

In an example of either or both of the first and second aspects, creating the authenticated facial feature database includes capturing the facial feature containing the environmental background feature while the person is in the suggested waiting area. When the environmental background feature area matches with the authenticated environmental background feature, the facial feature is set as the authenticated facial feature and is stored. When the environmental background feature area does not match with the authenticated environmental background feature, the facial feature is not set as the authenticated facial feature and is not saved.

In an example of either or both of the first and second aspects, the suggested waiting area is spaced from the electronic lock by a distance in a range of 20-100 cm.

In an example of either or both of the first and second aspects, when the environmental background feature is smaller than 30% of the real-time unlocking information, it is identified that the environmental background feature is incapable of being obtained from analysis, and the electronic lock remains in the locking state.

In an example of either or both of the first and second aspects, the unlocking method further comprises a step between analyzing the real-time unlocking information and comparing the facial feature and the environmental background feature. The step includes a real-time operation of authentication of the environmental background feature. A contour and a location of the facial feature in the real-time unlocking information and the authenticated environmental background feature are combined as a real-time operational environmental background feature information. When comparing the environmental background feature with the authenticated environmental background feature, the real-time operational environmental background feature information is compared with the environmental background feature obtained from analysis of the real-time unlocking information.

The present invention w % ill become clearer in light of the following detailed description of illustrative embodiments of this invention described in connection with the drawings.

Figure 1:
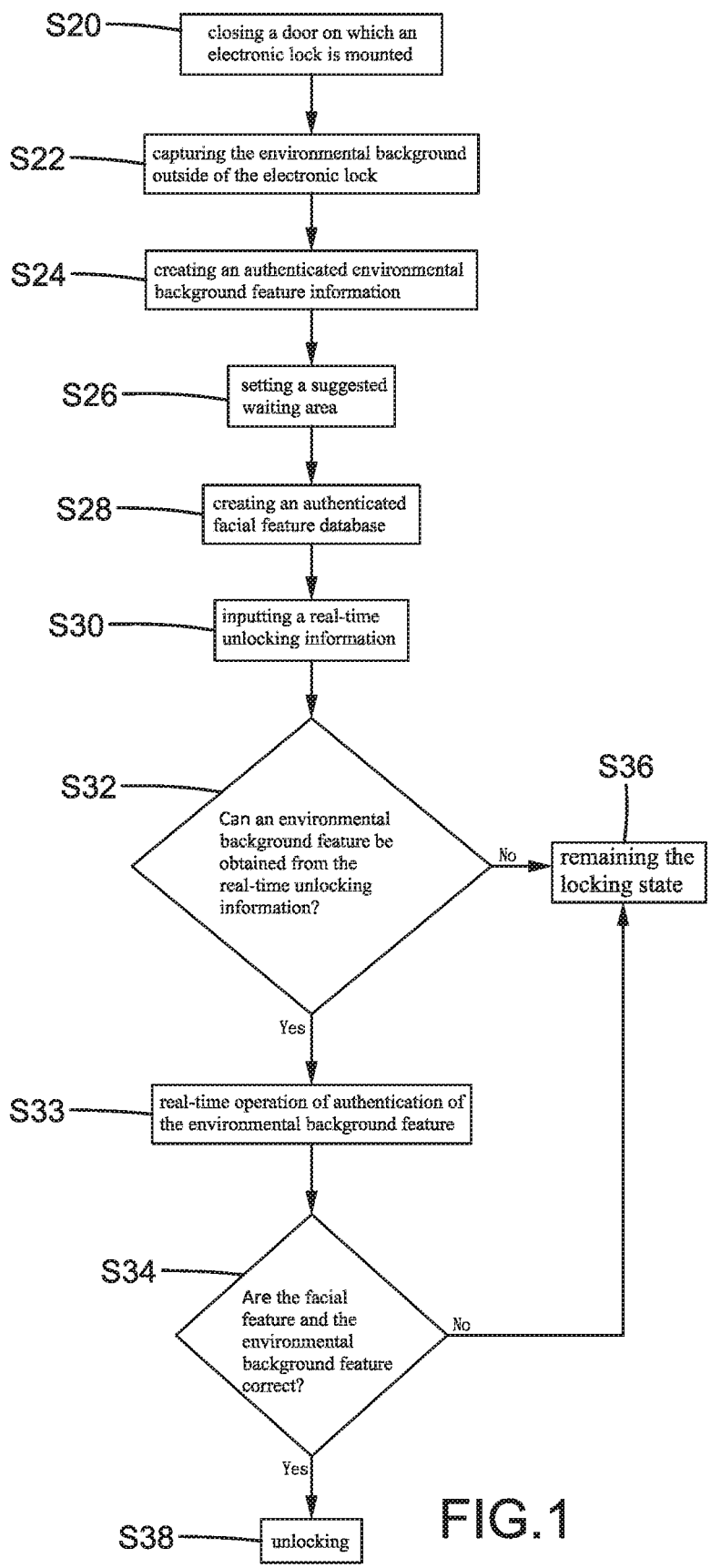
FIG. 1 shows a flowchart of an unlocking method for an electronic lock of a first example according to the present invention.
Figure 2:
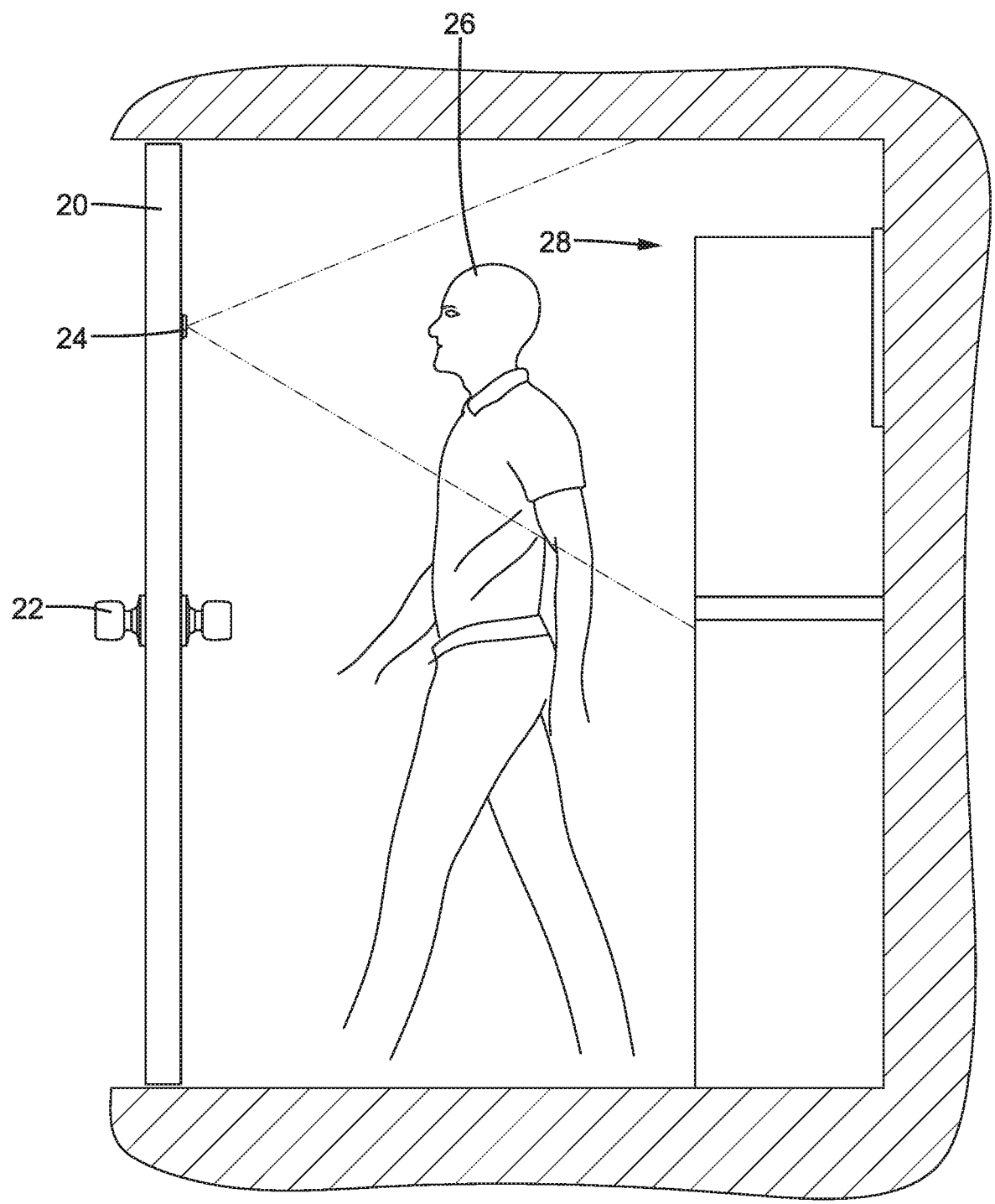
FIG. 2 is a diagrammatic view illustrating a system capable of carrying out the unlocking method according to the present invention.
Figure 3:
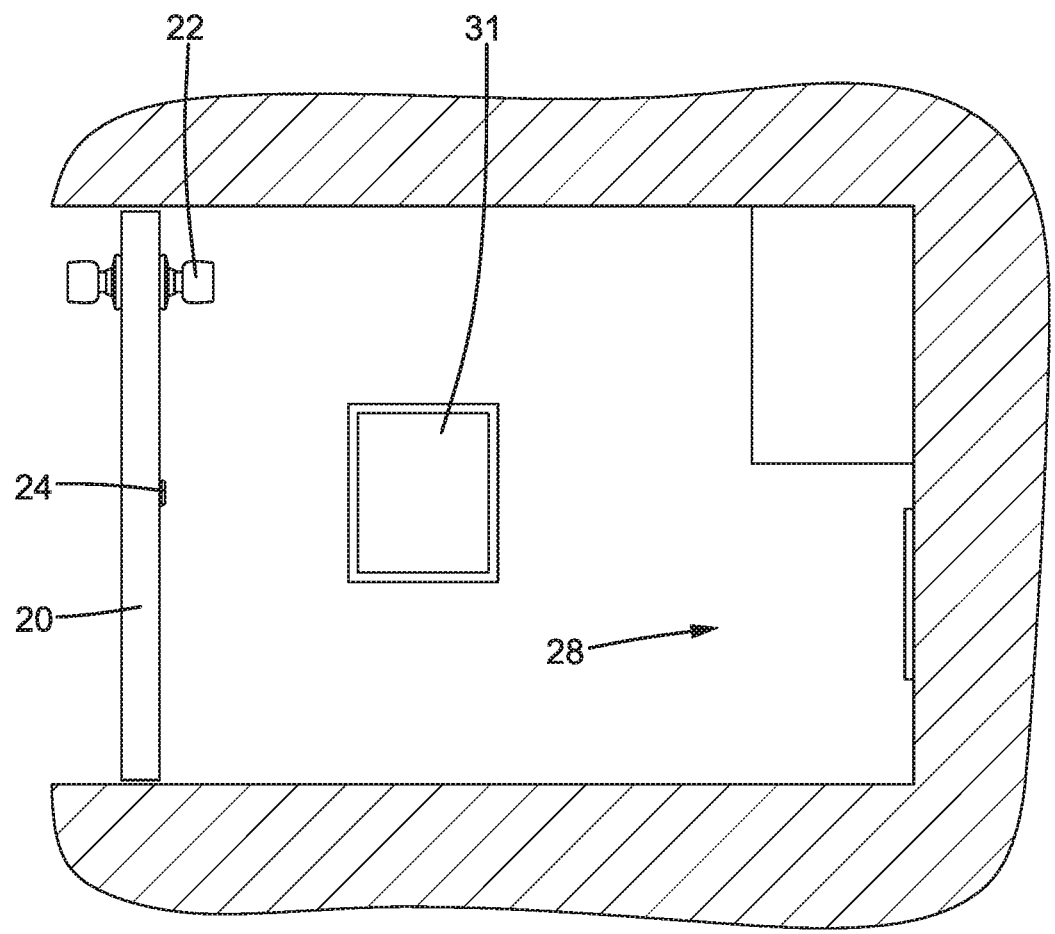
FIG. 3 is a cross sectional view illustrating a suggested waiting area of the system of FIG. 2.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "inner", "side", "portion", "spacing", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

The present invention relates to an unlocking method for an electronic lock and, more particularly, to an unlocking method for controlling locking and unlocking of an electronic lock that will not move after installation, such as an electronic lock mounted on a door, a safe, or a closet.

Although the position of the electronic lock of this type could be changed while opening or closing the door, the position of the electronic lock will not change when the door is in the closed position and will be deemed as an immobile electronic lock according to the present invention. Nevertheless, other types of immobile electronic locks used in similar conditions are included in the present invention.

With reference to FIGS. 1-4, for ease of explanation of an unlocking method of a first example according to the present invention used in a system, it is assumed that an electronic lock 22 of the system is mounted on a door 20 in a passageway. A camera 24 is disposed on the door 20 and is electrically connected to the electronic lock 22.

With reference to FIG. 1, the unlocking method of the first example according to the present invention includes closing a door (on which the electronic lock 22 is mounted) to a position in which the camera 24 faces an environmental background 28 located outside of the electronic lock 22 (step S20). Since the camera 24 is mounted on the door 20, the environmental background captured by the camera 24 while the door 20 is in the open position is different from the environmental background captured by the camera 24 while the door 20 is in the closed position. The door 20 must be in the closed position when a person 26 intends to unlock the electronic lock 22. Considering that the person 26 usually stands in a position facing the door 20 or the electronic lock 22, the environmental background feature is preferably captured after the door 20 is closed.

Next, the environmental background outside of the electronic lock 22 is captured in step S22. Specifically, when the door 20 is in the closed position, the camera 24 is used to capture the environmental background 28 located outside of the electronic lock 22. The environmental background 28 can be a simple wall or a ceiling. In an embodiment, a calendar, a painting, etc. can be disposed in the environmental background 28 and can increase the comparison feature of the environmental background 28 (see FIG. 4), enhancing safety and reducing the possibility of failure.

In step S24, an authenticated environmental background feature information is created. Specifically, the environmental background feature obtained in step S22 is set as an authenticated environmental background feature, and the authenticated environmental background feature is saved in an authenticated environmental background feature database. It is worth noting that the authenticated environmental background feature does not have to include the facial feature of any person 26. Namely, in a non-restrictive example, the camera 24 captures the whole environmental background feature while the door 20 is in the closed position.

In step S26, a suggested waiting area 31 is set. Specifically, a suggested waiting area 31 is set in a location properly spaced from the electronic lock 22. A person 26 in the suggested waiting area 31 can input a real-time unlocking information (see step S30). The distance between the suggested waiting area 31 and the electronic lock 22 can be in a range of 20-100 cm. In fact, the person 26 standing in the suggested waiting area 31 has a proper spacing to both the camera 24 and the environmental background 28. Thus, the information captured by the camera 24 has a proper ratio between the face of the person 26 and the environmental background. In an example, the face of the person 26 occupies about 30-70% of the image captured by the camera 24, and the environmental background is about 70-30% of the area of the image captured by the camera 24.

In step S28, an authenticated facial feature database is created. Specifically, at least one facial feature is set as an authenticated facial feature, and the authenticated environmental background feature is saved. In an example, when the person 26 is in the suggested waiting area 31, the camera 24 is operated to capture the facial feature of the person 26 and the environmental background feature (which can be included in the facial feature information). The system distinguishes an area of the facial feature from an area of the environmental background feature and compares the environmental feature area with the authenticated environmental background feature. When the environmental feature area matches with the authenticated environmental background feature, the distinguished facial feature is set as the authenticated facial feature and is stored in the authenticated facial feature database. On the other hand, when the environmental feature area does not match with the authenticated environmental background feature, the distinguished facial feature is not set as the authenticated facial feature and is not saved.

As mentioned above, in step S30, the person 26 in the suggested waiting area 31 and intending to unlock the electronic lock 22 inputs the real-time unlocking information containing the facial feature. In an embodiment, the system detects the presence of the person 26 in the suggested waiting area 31 and automatically activates the camera 24 to capture a real-time unlocking information containing the facial feature of the person 26 and the environmental background feature. Since the facial feature of the person 26 is captured while the person 26 is in the suggested waiting area 31, the real-time unlocking information has a proper ratio between the facial feature and the environmental background feature. In an embodiment shown in FIG. 4, the real-time unlocking information includes about 40% of the facial feature and about 60% of the environmental background feature, such that the system can have sufficient information to identify the facial feature and the environmental background feature.

Figure 4:
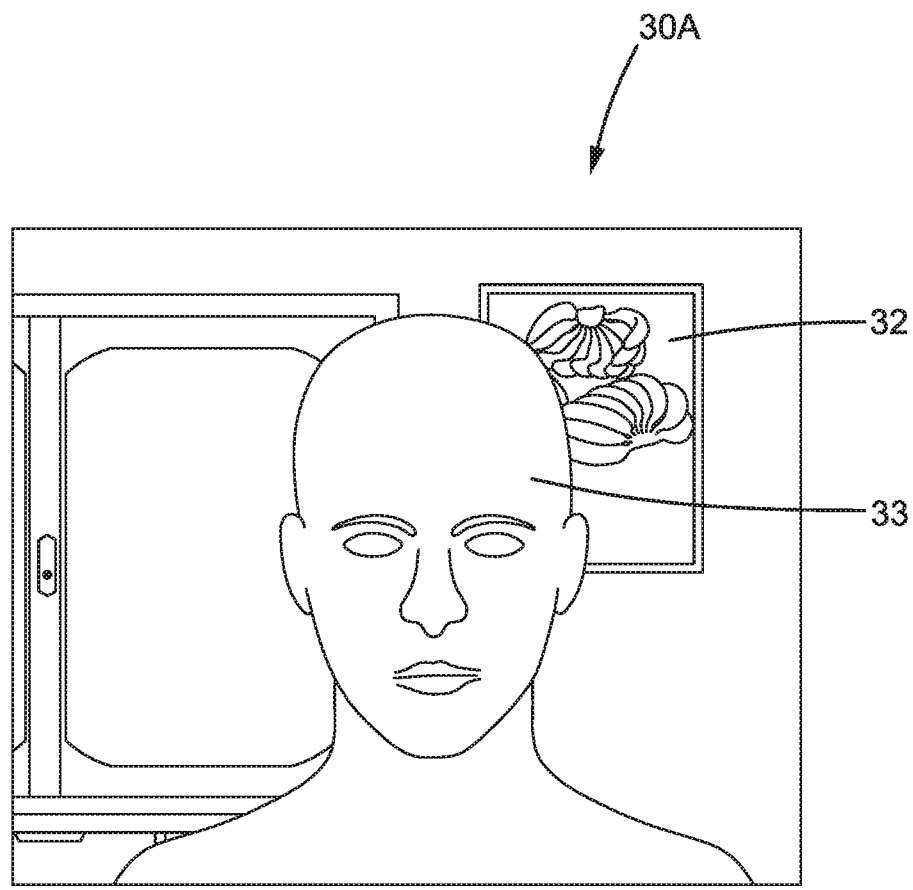
FIG. 4 is a diagrammatic view illustrating an example of capturing of a real-time unlocking information by a camera.

In step S32, the facial feature and the environmental feature are analyzed. Specifically, the facial feature and the environmental background feature are obtained from analysis of the inputted real-time unlocking information. The electronic lock 22 remains in the locking state when the environmental background feature cannot be obtained from the analysis (step S36). As shown in FIG. 4, the real-time unlocking information fulfilling the requirement of the system should include the facial feature of the person 26 intending to pass through the door 20 and the environmental background feature behind the person 26. Thus, in a case that the person 26 intends to fool the system with a photograph or a picture, the electronic lock 22 remains in the locking state (S36) as the photograph or picture does not include the environmental background feature. In a case that when the environmental background feature is smaller than 30% of the real-time unlocking information, it is identified that the environmental background feature cannot be obtained from analysis and the electronic lock 22 remains in the locking state (S36).

In a case that the facial feature and the environmental background feature in the real-time unlocking information can be distinguished from each other, that the facial feature is 30-70% (e.g., 35%) of the real-time unlocking information, and that the environmental background feature is 70-30% (e.g., 65%) of the real-time unlocking information, it is identified that the facial feature and the environmental background feature can be distinguished and obtained from analysis of the real-time unlocking information.

FIG. 4 shows an embodiment of the real-time unlocking information 30A. In this embodiment, the facial feature information 33 is about 30-40% of the real-time unlocking information 30A, and the environmental background feature information 32 is about 70-60% of the real-time unlocking information 30A. Furthermore, the facial feature information 33 is substantially located in a central location of the real-time unlocking information 30A. Thus, the facial feature information 33 and the environmental background feature information 32 as well as the location of the facial feature information 33 are proper.

Figure 5:
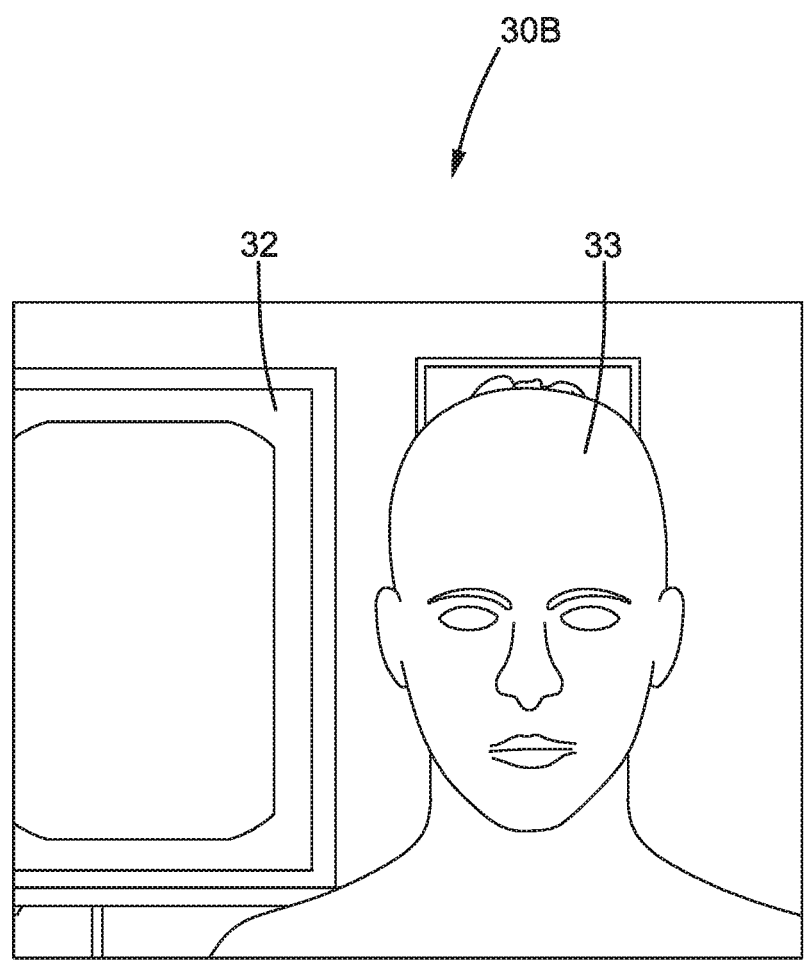
FIG. 5 is a diagrammatic view illustrating another example of capturing of a real-time unlocking information by a camera.

FIG. 5 shows another embodiment of the real-time unlocking information 30B captured by the camera 24 when the person 26 is in a position other than the suggested waiting area 31. The facial feature of the person 26 is not in the center of the real-time unlocking information 30B. Nevertheless, the facial feature information 33 is 30-40% of the real-time unlocking information 30B, and the environmental background feature information 32 is 70-60% of the real-time unlocking information 30B. In this state, the facial feature information 33 and the environmental background feature information 32 can be obtained from analysis of the real-time unlocking information 30B.

In step S33, a real-time operation of authentication of the environmental background feature is carried out. Specifically, the contour and location of the facial feature in the real-time unlocking information 30A or 30B and the authenticated environmental background feature are combined as a real-time operational environmental background feature information 32A. When comparing the environmental background feature with the authenticated environmental background feature, the real-time operational environmental background feature information 32A is compared with the environmental background feature obtained from analysis of the real-time unlocking information 30A or 30B.

In step S34, the facial feature and the environmental background feature are compared. Specifically, the facial feature information 33 obtained from analysis of the real-time unlocking information 30A or 30B is compared with the authenticated facial feature in the authenticated facial feature database. Furthermore, the environmental background feature information 32 obtained from analysis of the real-time unlocking information 30A or 30B is compared with the authenticated environmental background feature in the authenticated environmental background feature database. When the facial feature information 33 obtained from analysis of the real-time unlocking information 30A or 30B does not match with the authenticated facial feature and/or the environmental background feature information 32 obtained from analysis of the real-time unlocking information 30A or 30B does not match with the authenticated environmental background feature, the electronic lock 22 remains in the locking state (S36). When the facial feature information 33 obtained from analysis of the real-time unlocking information 30A or 30B matches with the authenticated facial feature and the environmental background feature information 32 obtained from analysis of the real-time unlocking information 30A or 30B matches with the authenticated environmental background feature, the electronic lock 22 is unlocked (S38).

Specifically, after the camera 24 captures the real-time unlocking information, the real-time unlocking information is analyzed to obtain the facial feature information 33 and the environmental background feature information 32. The facial feature information 33 is compared with the authenticated facial feature in the authenticated facial feature database, and the environmental background feature information 32 is compared with the authenticated environmental background feature in the authenticated environmental background feature database. The electronic lock 22 remains in the locking state (S36) when at least one of the facial feature information 33 and the environmental background feature information 32 is not correct. The system controls the electronic lock 22 to proceed with the unlocking operation only when both the facial feature information 33 and the environmental background feature information 32 are correct (S38).

Figure 6:
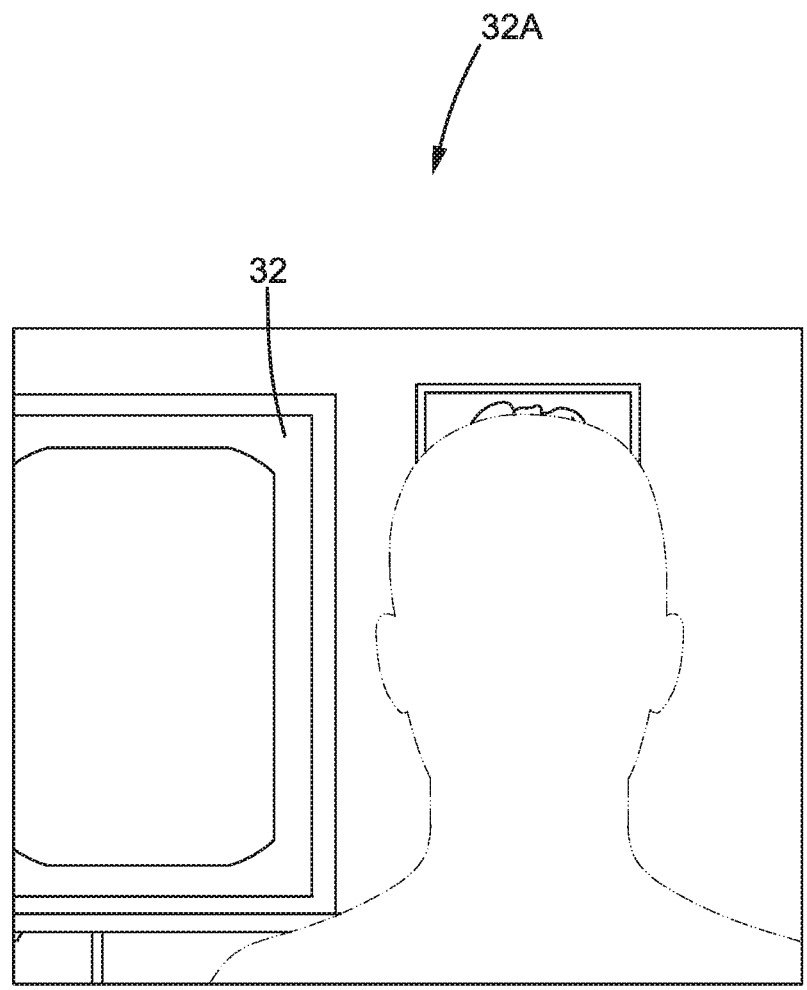
FIG. 6 is a diagrammatic view illustrating formation of a real-time operational environmental background feature information by combing the location and the contour of a facial feature in a real-time unlocking information with an authenticated environmental background feature information.

With reference to FIG. 6, it is worth noting that the shielded area of the environmental background feature differs when the person 26 stands in different positions. Nevertheless, during matching of the environmental background feature information 32 with the authenticated environmental background feature, the location and contour of the facial feature information 33 in the real-time unlocking information can be analyzed through operation. Then, the authenticated environmental background feature is processed to include the facial contour of the same person at the same location through operation, as shown in FIG. 6. Thus, a portion of the authenticated environmental background feature is shielded to obtain a real-time operational environmental background feature information 32A. The shielded location and contour of the real-time operational environmental background feature information 32A should be identical to and will be used to compare with the environmental background feature information 32 obtained from analysis of the real-time unlocking information.

In an embodiment, the Time-of-Flight (ToF) technique for measuring distance can be used to analyze the facial feature and the environmental background feature. Specifically, the camera 24 includes a ToF lens module which can be used to measure the distance of the face and the environmental background 28 to thereby proceed with real-time judgment of the facial contour and the environmental background 28. More specifically, with reference to FIGS. 2 and 3, when the person 26 stands in the suggested waiting area 31, the distance between the face and the camera 24 is far smaller than the distance between the environmental background 28 and the camera 24. The ToF lens module can measure the distance between the person 26 and the camera 24 based on the time difference of the reflected light. Through operation, the facial feature information 33 and the environmental background feature information 32 can be analyzed after obtaining the real-time unlocking information, and the location and the contour of the face in the real-time unlocking information can also be obtained.

Figure 7:
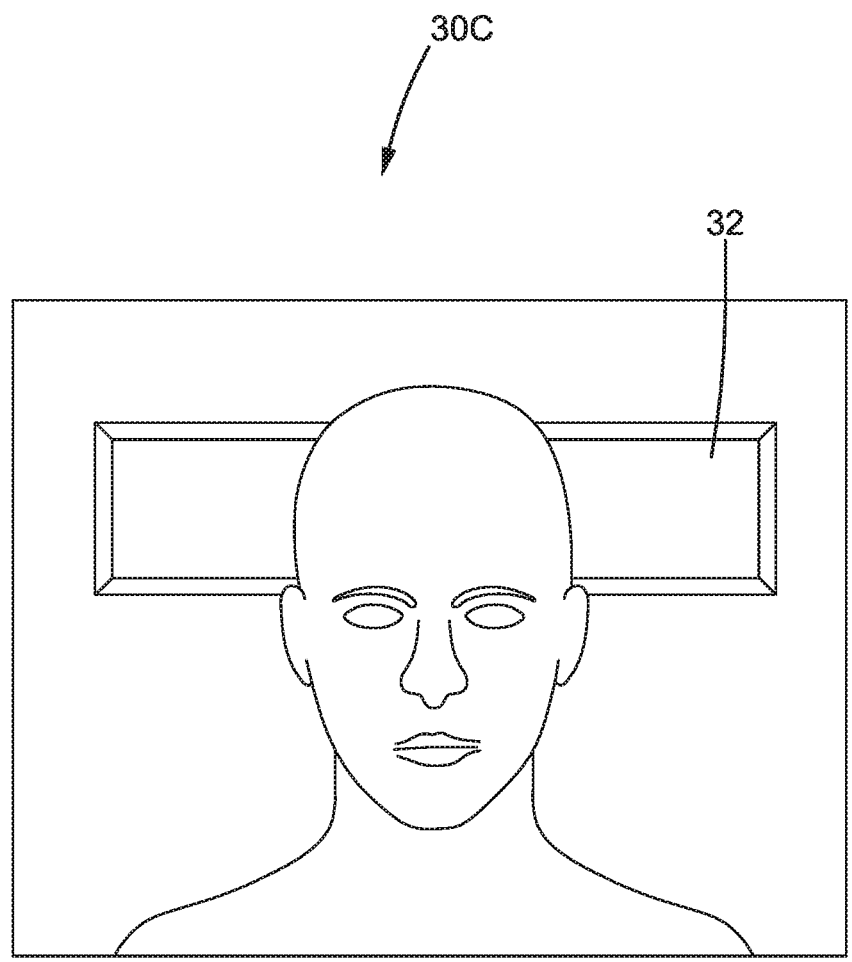
FIG. 7 is a diagrammatic view illustrating an erroneous real-time unlocking information.

FIG. 7 shows an erroneous real-time unlocking information 30C captured by the camera 24. For example, the real-time unlocking information 30C is obtained from using the camera 24 to capture a picture or a screen. Assume the facial feature in the erroneous real-time unlocking information 30C matches with the authenticated facial feature, but the environmental background feature obtained from analysis of the erroneous real-time unlocking information 30C does not match with the authenticated environmental background feature, the electronic lock 22 remains in the locking state.

Figure 8:
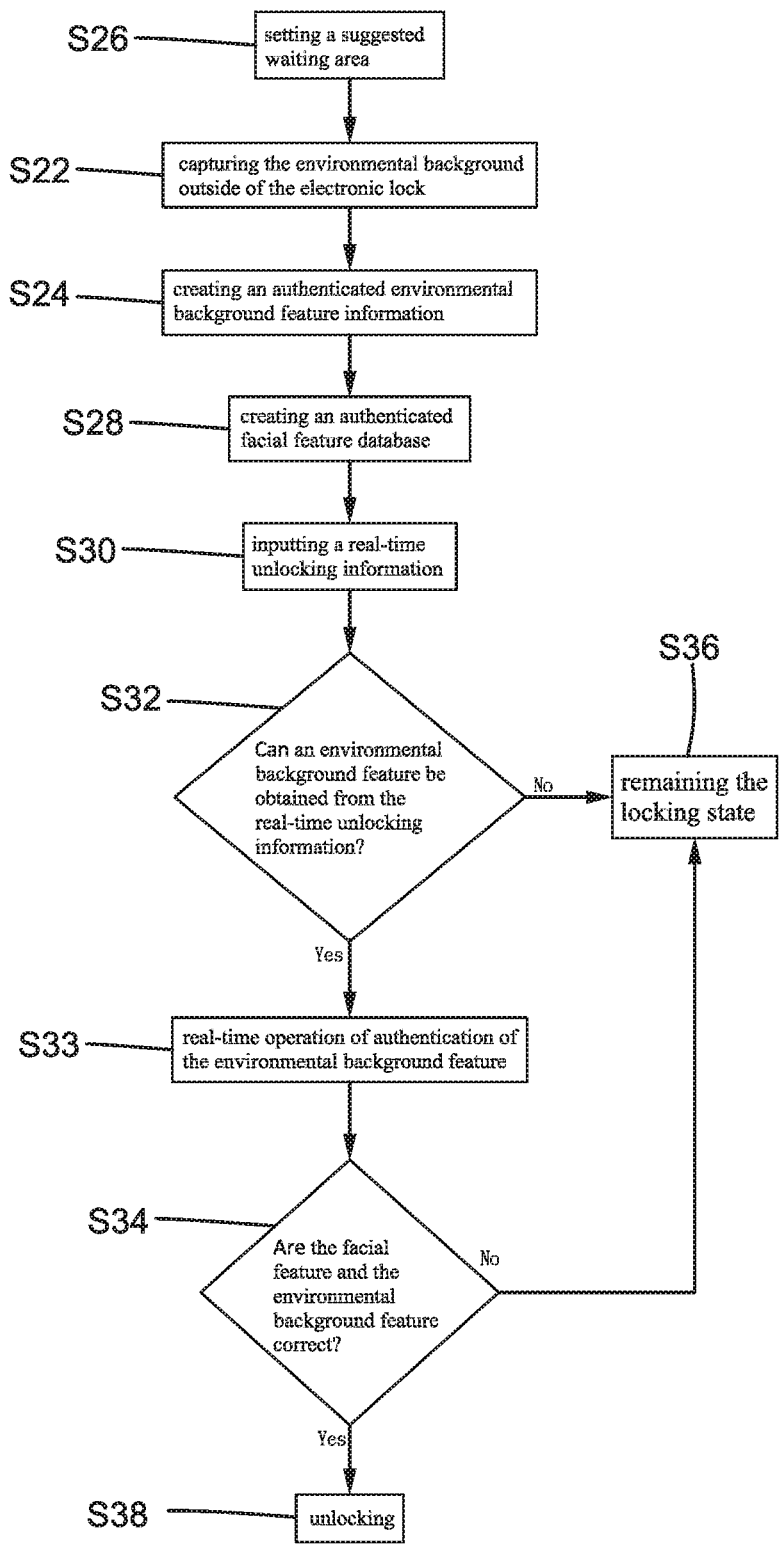
FIG. 8 shows a flowchart of an unlocking method for an electronic lock of a second example according to the present invention.
Figure 9:
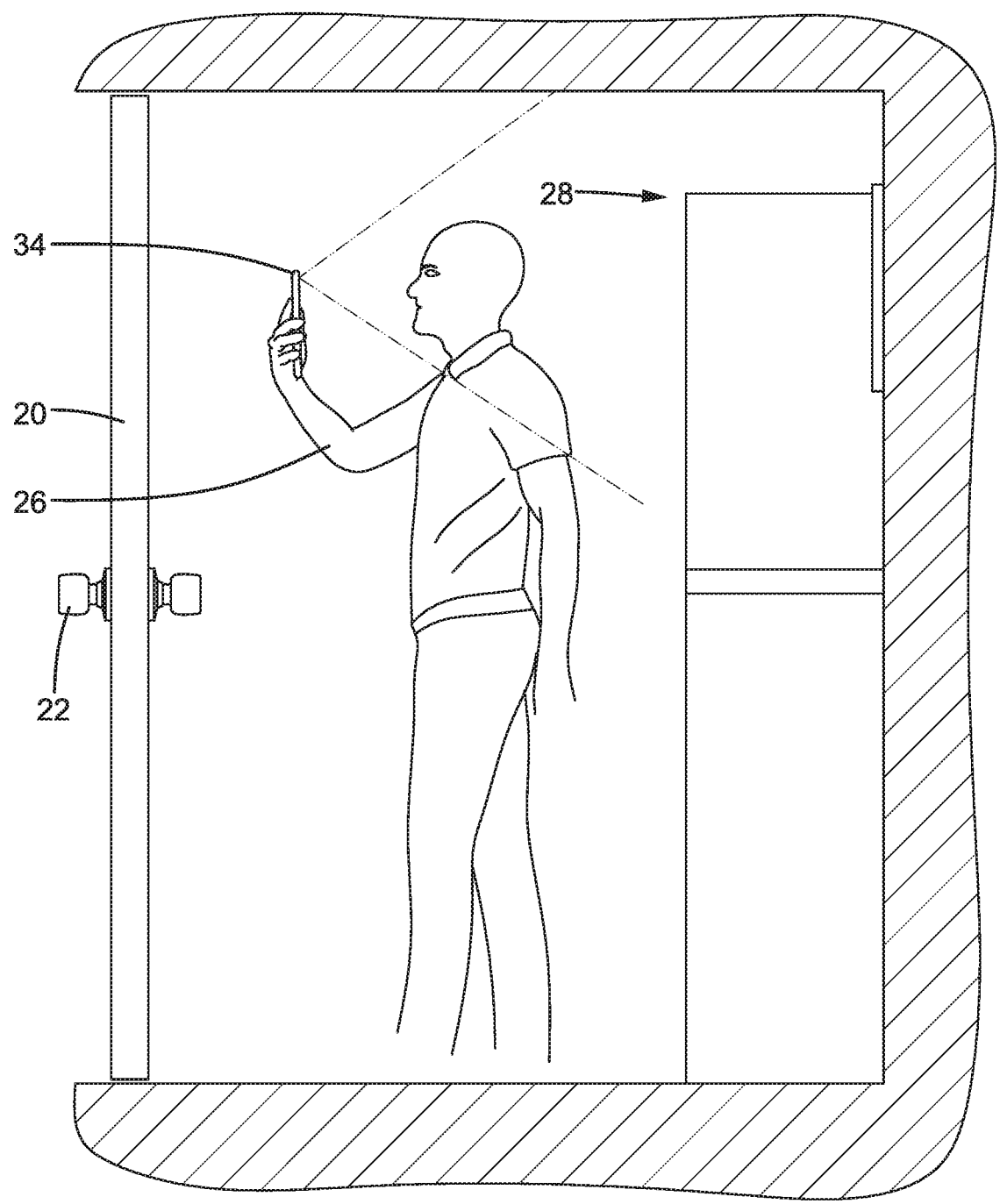
FIG. 9 is a diagrammatic view illustrating a system capable of carrying out the unlocking method of FIG. 8.

FIG. 8 shows a flowchart of an unlocking method for an electronic lock of a second example according to the present invention which can be carried out by a system shown in FIG. 9. In this embodiment, the door 20 does not include a camera, and a mobile device 36 (such as a smart phone or a tablet computer) with a camera connected to the electronic lock 22 through wireless connection (such as Bluetooth). In comparison with the embodiment using a camera 24 mounted on the door 20, since this embodiment uses the camera on the mobile device 36 to capture the real-time unlocking information and requires an authenticated environmental background feature information and an authenticated facial feature information, the unlocking method of this example is slightly different from the unlocking method described with reference to FIG. 1.

Specifically, in the unlocking method of the second example, a suggested waiting area 31 is set to obtain a good environmental background feature information (step S26). The suggested waiting area 31 is in a location properly spaced from the electronic lock 22 (see FIG. 3).

After setting the suggested waiting area 31, the environmental background outside of the electronic lock 22 is captured in step S22. A person 26 standing in the suggested waiting area 31 can use the mobile device 36 with the camera to capture the environmental background 28 outside of the electronic lock 22. The captured environmental background feature is used to create an authenticated environmental background feature information (step S24). In this embodiment, the person 26 standing in the suggested waiting area 31 connects the mobile device 36 with the electronic lock 22 and uses the camera on the mobile device 36 to capture the environmental background. In an example, the person 26 faces away from the environmental background 28 while taking a photograph or videotaping.

In step S24, the environmental background 28 captured by the camera of the mobile device 36 is transmitted to the electronic lock 22 and is set as an authenticated environmental background feature information, and the authenticated environmental background feature information is saved. It is worth noting that the authenticated environmental background feature information can be directly stored in the mobile device 36 instead of transmission to the electronic lock 22.

In step S28, an authenticated facial feature database is created. Specifically, at least one facial feature is set as an authenticated facial feature, and the authenticated facial feature is saved. In an example, when the person 26 stands in the suggested waiting area 31 and faces the electronic lock 22, the camera of the mobile device 36 is operated to capture the facial feature and the environmental background feature. The system distinguishes an area of the facial feature from an area of the environmental background feature and compares the environmental feature area with the authenticated environmental background feature. When the environmental feature area matches with the authenticated environmental background feature, the distinguished facial feature is set as the authenticated facial feature and is stored in the authenticated facial feature database. On the other hand, when the environmental feature area does not match with the authenticated environmental background feature, the distinguished facial feature is not set as the authenticated facial feature. Furthermore, the authenticated facial feature database can be directly stored in the mobile device 36 rather than the electronic lock 22.

It is noted that the steps S30 (inputting a real-time unlocking information), S32 (analyzing the facial feature and the environmental background feature), S33 (real-time operation of authentication of the environmental background feature), S34 (comparing the facial feature and the environmental background feature), S36 (remaining the locking state), and S38 (unlocking) in the embodiment described with reference to FIGS. 1-7 can be used in this embodiment and, therefore, will not be described again to avoid redundancy.

In a case that the authenticated environmental background feature information and the authenticated facial feature database are directly stored in the mobile device 36 with the camera, the steps S32 (analyzing the facial feature and the environmental background feature), S33 (real-time operation of authentication of the environmental background feature), and S34 (comparing the facial feature and the environmental background feature), are carried out by the mobile device 36. Furthermore, in step S34, when the facial feature matches with the authenticated facial feature and when the environmental background feature matches with the authenticated environmental background feature, the mobile device 36 controls the electronic lock 22 to proceed with the unlocking operation. On the other hand, when the facial feature does not match with the authenticated facial feature and/or when the environmental background feature does not match with the authenticated environmental background feature, the electronic lock 22 remains in the locking state. In a case that the authenticated environmental background feature information and the authenticated facial feature database are stored in the electronic lock 22, the steps S32 (analyzing the facial feature and the environmental background feature), S33 (real-time operation of authentication of the environmental background feature), and S34 (comparing the facial feature and the environmental background feature), are carried out by the electronic lock 22.

In the unlocking method according to the present invention, the unlocking procedure can be conducted only when both the facial feature and the environmental background feature are correct. Furthermore, since the authenticated environmental background feature is the environmental background where the electronic lock 22 locates, the person 26 intending to unlock the electronic lock 22 must be near the electronic lock 22 to capture the real-time unlocking information so as to capture the correct facial feature and the correct environmental background feature. It is very difficult to obtain the correct facial feature and the correct environmental background feature of an authorized person by any other person. This greatly reduces the possibility of unlocking of the electronic lock 22 through cheating.

Furthermore, when the camera 24 is equipped with a ToF lens module, the distance between the face and the environmental background can be measured. This allows subsequent confirmation of whether the inputted real-time unlocking information is a photograph, a picture, or a screen basing on the fact that the distance of the facial feature in the photograph, picture, or screen is the same as the environmental background feature. This further reduces the possibility of unlocking of the electronic lock 22 through cheating.

Now that the basic teachings of the present invention have been explained, many extensions and variations will be obvious to one having ordinary skill in the art. For example, a user can still operate while standing in a proper location based on experience without setting the suggested waiting area 31. Acceptable real-time unlocking information (from which the facial feature information 33 and the environmental background information 32 can be obtained through analysis) is not limited to the patterns shown in FIGS. 4-6. Alternatively, comparison of the environmental background feature does not have to be carried out while creating the authenticated facial feature database. The authenticated facial feature can be created by other approaches. For example, the electronic lock 22 can include a button therein, and this button can be pressed only when a housing of the electronic lock 22 is detached. The button is preferably disposed on an indoor side of the electronic lock 22. After the button is pressed, the captured facial feature can be set by the system as an authenticated facial feature.

The unlocking method according to the present invention is not limited to application on a door lock in a passageway.

Namely, the unlocking method according to the present invention can be used on a lock whose location will not change after installation. For example, the unlocking method according to the present invention can be used on a lock disposed on a safe or a closet, because the positon of the lock and the environmental background are fixed when the safe or the closet is in the closed position.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An unlocking method for an electronic lock, comprising:
    creating an authenticated environmental background feature information including setting an environmental background feature as an authenticated environmental background feature and saving the authenticated environmental background feature in an authenticated environmental background feature database, wherein the environmental background feature is a feature of the environmental background where the electronic lock locates;
    creating an authenticated facial feature database including setting at least one facial feature as an authenticated facial feature and saving the authenticated facial feature in the authenticated facial feature database;
    inputting a real-time unlocking information including inputting the real-time unlocking information containing a facial feature of a person intending to unlock the electronic lock;
    analyzing the real-time unlocking information to obtain the facial feature of the person and an environmental background feature, wherein the authenticated electronic lock remains in a locking state when the environmental background feature is not obtained; and
    comparing the facial feature obtained from analysis of the real-time unlocking information with the authenticated facial feature in the authenticated facial feature database and comparing the authenticated environmental background feature obtained from analysis of the real-time unlocking information with the authenticated environmental background feature in the authenticated environmental background feature database, wherein when the facial feature obtained from analysis of the real-time unlocking information does not match with the authenticated facial feature and/or the environmental background feature obtained from analysis of the real-time unlocking information does not match with the authenticated environmental background feature, the electronic lock remains in the locking state, wherein when the facial feature obtained from analysis of the real-time unlocking information matches with the authenticated facial feature and the environmental background feature obtained from analysis of the real-time unlocking information matches with the authenticated environmental background feature, the electronic lock is unlocked.

2. The unlocking method for the electronic lock as claimed in claim 1, wherein the electronic lock is mounted on a door on which a camera is disposed and electrically connected to the electronic lock, wherein the camera includes a ToF lens module, wherein the unlocking method further comprises steps prior to creating the authenticated environmental background feature information, wherein the steps include:
    closing the door on which the electronic lock is mounted, wherein the camera faces the environmental background outside of the electronic lock when the door is in a closed position; and
    capturing the environmental background outside of the electronic lock while the door is in the closed position, and using the environmental background feature to create the authenticated environmental background feature information.

3. The unlocking method for the electronic lock as claimed in claim 1, further comprising setting a suggested waiting area spaced from the electronic lock, wherein the real-time unlocking information is inputted by the person when the person is in the suggested waiting area.

4. The unlocking method for the electronic lock as claimed in claim 3, wherein creating the authenticated facial feature database includes capturing the facial feature containing the environmental background feature while the person is in the suggested waiting area, wherein when the environmental background feature area matches with the authenticated environmental background feature, the facial feature is set as the authenticated facial feature and is stored, when the environmental background feature area does not match with the authenticated environmental background feature, the facial feature is not set as the authenticated facial feature and is not saved.

5. The unlocking method for the electronic lock as claimed in claim 3, wherein the suggested waiting area is spaced from the electronic lock by a distance in a range of 20-100 cm.

6. The unlocking method for the electronic lock as claimed in claim 1, wherein the authenticated environmental background feature in creatine the authenticated environmental background information is an image of the environmental background where the electronic lock locates, wherein the environmental background feature of the real-time unlocking information is an image of the environmental background where the person locates, wherein when an ara of the image of an environmental background where the electronic lock locates is smaller than 30% of an area of the image of the environmental background contained in the real-time unlocking information, it is identified that the environmental background feature contained in the real-time unlocking information is incapable of being obtained from analysis, and the electronic lock remains in the locking state.

7. The unlocking method for the electronic lock as claimed in claim 1, further comprising a step between analyzing the real-time unlocking information and comparing the facial feature and the environmental background feature, wherein the step includes:
    a real-time operation of authentication of the environmental background feature, wherein a contour and a location of the facial feature in the real-time unlocking information and the authenticated environmental background feature are combined as a real-time operational environmental background feature information, wherein when comparing the environmental background feature with the authenticated environmental background feature, the real-time operational environmental background feature information is compared with the environmental background feature obtained from analysis of the real-time unlocking information.

8. An unlocking method for an electronic lock, comprising:
  setting a suggested waiting area spaced from the electronic lock;
  capturing an environmental background outside of the electronic lock by a person standing in the suggested waiting area, using an environmental background feature to create an authenticated environmental background feature information, and saving the authenticated environmental background feature information in an authenticated environmental background feature database, wherein the environmental background feature is a feature of the environmental background;
  creating an authenticated facial feature database including setting at least one facial feature as an authenticated facial feature and saving the authenticated facial feature in the authenticated facial feature database;
  inputting a real-time unlocking information including inputting the real-time unlocking information containing a facial feature of the person intending to unlock the electronic lock;
  analyzing the real-time unlocking information to obtain the facial feature of the person and an environmental background feature, wherein the authenticated electronic lock remains in a locking state when the environmental background feature is not obtained; and
  comparing the facial feature obtained from analysis of the real-time unlocking information with the authenticated facial feature in the authenticated facial feature database and comparing the environmental background feature obtained from analysis of the real-time unlocking information with the authenticated environmental background feature in the authenticated environmental background feature database, wherein when the facial feature obtained from analysis of the real-time unlocking information does not match with the authenticated facial feature and/or the environmental background feature obtained from analysis of the real-time unlocking information does not match with the authenticated environmental background feature, the electronic lock remains in the locking state, wherein when the facial feature obtained from analysis of the real-time unlocking information matches with the authenticated facial feature and the environmental background feature obtained from analysis of the real-time unlocking information matches with the authenticated environmental background feature, the electronic lock is unlocked.

9. The unlocking method for the electronic lock as claimed in claim 8, wherein the suggested waiting area is spaced from the electronic lock by a distance in a range of 20-100 cm.

10. The unlocking method for the electronic lock as claimed in claim 8, wherein the authenticated environmental background feature in creatine the authenticated environmental background information is an image of the environmental background where the electronic lock locates, wherein the environmental background feature of the real-time unlocking information is an image of the environmental background where the person locates, wherein when an ara of the image of an environmental background where the electronic lock locates is smaller than 30% of an area of the image of the environmental background contained in the real-time unlocking information, it is identified that the environmental background feature contained in the real-time unlocking information is incapable of being obtained from analysis, and the electronic lock remains in the locking state.

11. The unlocking method for the electronic lock as claimed in claim 8, wherein creating the authenticated facial feature database includes capturing the facial feature containing the environmental background feature while the person is in the suggested waiting area, wherein when the environmental background feature area matches with the authenticated environmental background feature, the facial feature is set as the authenticated facial feature and is stored, when the environmental background feature area does not match with the authenticated environmental background feature, the facial feature is not set as the authenticated facial feature and is not saved.

12. The unlocking method for the electronic lock as claimed in claim 8, further comprising a step between analyzing the real-time unlocking information and comparing the facial feature and the environmental background feature, wherein the step includes:
  a real-time operation of authentication of the environmental background feature, wherein a contour and a location of the facial feature in the real-time unlocking information and the authenticated environmental background feature are combined as a real-time operational environmental background feature information, wherein when comparing the environmental background feature with the authenticated environmental background feature, the real-time operational environmental background feature information is compared with the environmental background feature obtained from analysis of the real-time unlocking information.

\* \* \* \* \*